United States Patent [19]
Yu et al.

[11] Patent Number: 5,986,483
[45] Date of Patent: Nov. 16, 1999

[54] DIRECT DIGITAL FREQUENCY SYSTHESIZER

[75] Inventors: Tzong-Bang Yu, Yi-Lan Hsien; Shen-Iuan Liu, Keelung; Hen-Wai Tsao, Taipei, all of Taiwan

[73] Assignee: National Science Council, Taipei, Taiwan

[21] Appl. No.: 08/980,655

[22] Filed: Dec. 1, 1997

[30] Foreign Application Priority Data

Oct. 2, 1997 [TW] Taiwan ................................. 86114399

[51] Int. Cl.[6] .................. G06F 1/02; H04L 27/20
[52] U.S. Cl. ..................... 327/107; 327/105; 364/718; 364/721
[58] Field of Search ...................... 327/105, 115, 327/116, 106, 107, 141; 364/721, 718

[56] References Cited

U.S. PATENT DOCUMENTS

5,073,869  12/1991  Bjerede ..................... 364/718

*Primary Examiner*—Dinh T. Le
*Attorney, Agent, or Firm*—Ladas & Parry

[57] ABSTRACT

A direct digital frequency synthesizer outputting a sine signal is disclosed, comprising an accumulator, a symmetry circuit, a coarse circuit, a fine circuit and a sign circuit, wherein the accumulator sequentially outputs a sample address according to a frequency control signal. The symmetry circuit takes the complement of the sample address according to a first clock, the period of the first clock being twice the period of the first MSB of the sample address, to obtain a symmetric sample address represented by N bits. The coarse circuit connected to the symmetry circuit outputs the first M MSBs of the symmetric sample address as the first M MSBs of the sine signal. The fine circuit predicts the last N-M LSBs of the sine signal from the last N-M LSBs of the symmetric sample address according to the first M MSBs of the symmetric sample address of the coarse circuit. Then, the sign circuit outputs a sign bit of the sine signal according to a second clock, the period of the second clock being four times that of the period of the first MSB of the symmetric sample address.

12 Claims, 5 Drawing Sheets

DIRECT DIGITAL FREQUENCY SYSTHESIZER

FIELD OF THE INVENTION

The present invention relates in general to a digital frequency synthesizer, and in particular, to a direct digital frequency synthesizer, which utilizes a decomposition method instead of the conventional sine table look-up methods and therefore eliminates the need for a sine ROM table and increases the operating frequency.

BACKGROUND OF THE INVENTION

In communication systems, FSK (frequency-shift-keying) modulation/demodulation systems are often used to modulate a digital signal (like 0 and 1) at transmitting terminals into an analog signal with two kinds of frequencies (like f0 and f1), and demodulate the modulated analog signal with such two kinds of frequencies at receiving terminals back to a recovered digital signal, so that the data enclosed in the modulated analog signal can be distinguished. In such modulation/demodulation systems, since the alternation frequency of the inputted digital signal between logic 0's and 1's is very fast, high-frequency noise at transmitting terminals may occur.

Figure 1:
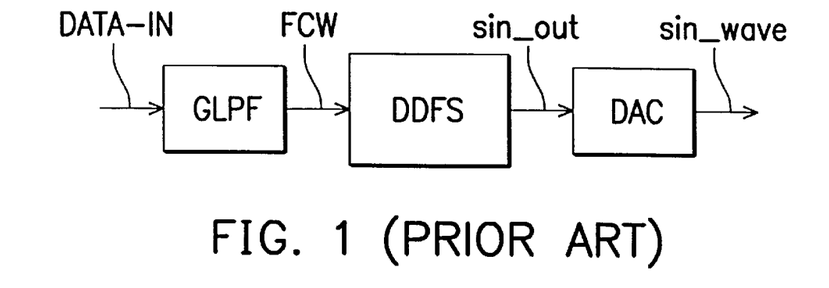
FIG. 1 (Prior Art) is a block diagram of a GFSK modulation/demodulation system.

Therefore, GFSK modulation/demodulation systems have been designed as FIG. 1 (Prior Art) to reduce high-frequency noise introduced in conventional FSK modulation/demodulation systems. In GLPF modulation systems, an digital signal Data_in (like 0 and 1) is first input to a Gaussian low-pass filter GLPF to obtain a frequency control word FCW, which is smoother than the inputted digital signal Data_in and is represented by a plurality of bits according to the Gaussian low-pass filtter GLPF. The frequency control word FCW then is inputted to a direct digital frequency synthesizer DDFS to obtain a corresponding digital sine signal Sin_out, which is outputted through the D/A converter DAC as the modulated analog sine signal Sin_wave.

The advantages of GFSK modulation systems are:
1. A constant envelope;
2. A narrow power spectrum; and
3. Non-coherent detection.

Figure 2:
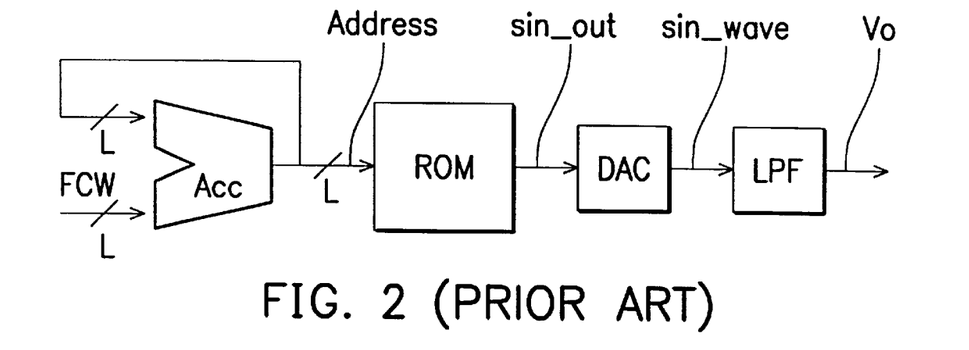
FIG. 2 (Prior Art) is a circuit diagram of a conventional direct digital frequency synthesizer.

FIG. 2 (Prior Art) is a circuit diagram of a conventional direct digital frequency synthesizer DDFS. The direct digital frequency synthesizer comprises an accumulator Acc, a sine ROM, a digital-to-analog converter DAC and a low-pass filter LPF, wherein the accumulator Acc is used to sequentially output a sample address ADDRESS according to a frequency control word FCW. The sample address ADDRESS and the frequency control word FCW can be respectively represented by L bits. The sine ROM is looked up according to the sample address ADDRESS and a corresponding digital sine signal Sin_is outputted. Then, the digital sine signal Sin_is output through the digital-to-analog converter DAC and the low-pass filter LPF to obtain a corresponding analog sine signal Sin_wave and the modulated output Vo. In this case, since the sine signal has been digitized, the direct digital frequency synthesizer DDFS can avoid such problems as the ageing of components, frequency deviation, high-frequency noise interference, and can easily achieve better communication quality, interference robustness, anti-eavesdrop and extra functions. In addition, the relative phase and sign of each node in GFSK modulation/demodulation systems are also shown in FIG. 2.

However, the size of the direct digital frequency synthesizer DDFS is large because of the sine ROM. Generally, in order to reduce high-frequency noise in the direct digital frequency synthesizer DDFS, the frequency control word FCW is often represented by 16 or more bits. That is, there are $2^{16}$ sine signal samples stored in the sine ROM, therefore, as the size of the sine ROM increases high-frequency noise is reduced.

Consequently, most conventional direct digital frequency synthesizers utilize various kinds of decompositions of the sine function to reduce the number of the stored sine signal samples to thereby reduce the size of the sine ROM.

Figure 3:
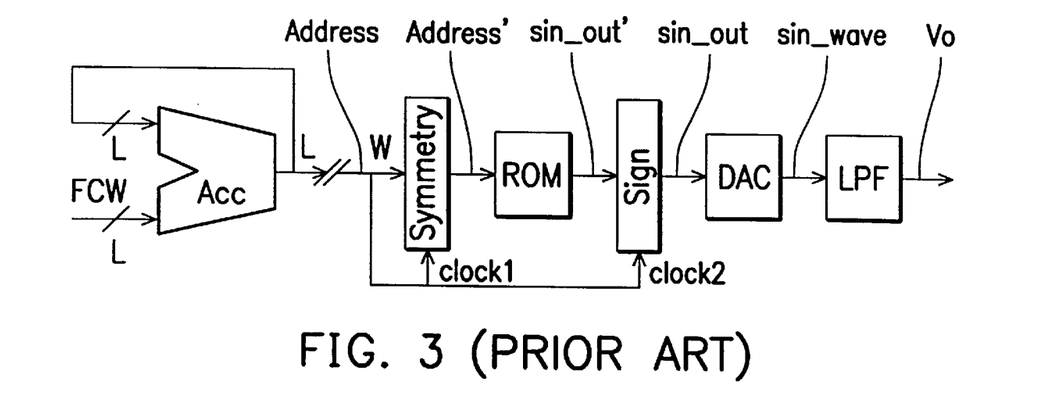
FIG. 3 (Prior Art) is a circuit diagram of another conventional direct digital frequency synthesizer using the symmetry property of the sine function.

FIG. 3 (Prior Art) is a circuit diagram of another conventional direct digital frequency synthesizer using the symmetry property of the sine function. Differing from the direct digital frequency synthesizer of FIG. 2, the sample address ADDRESS outputted from the accumulator Acc is first transmitted to a symmetry circuit SYMMETRY before being transmitted to the sine ROM, and, the digital sine signal Sin_out is first transmitted to a sign circuit SIGN before being transmitted to the digital-to-analog converter DAC.

Often, the symmetry circuit SYMMETRY is an XOR gate controlled by a clock CLOCK1 the period of which is twice that of the first MSB of the sample address ADDRESS. Furthermore, the accumulator Acc is designed to have more bits than the sample address ADDRESS. When the accumulator Acc is designed to have 16 bits and the sample address ADDRESS is the last 12 LSBs of the output of the accumulator Acc, the clock CLOCK1 can also be the last $13^{th}$ LSB of the output of the accumulator Acc. In addition, the symmetry circuit SYMMETRY, which may be the XOR gate, can then the take 1's (or 2's) complement of the sample address ADDRESS to sequentially output a symmetric sample address ADDRESS' every two period 2T (T is the period of the sample address ADDRESS). That is, the symmetry circuit outputs the sample address in a period and the 1's (or 2's) complement of the sample address in the next period as the symmetric sample address ADDRESS'.

The sign circuit SIGN may be an inverter controlled by a clock CLOCK2 of which the period is four times as the first MSB of the sample address ADDRESS. The clock CLOCK1 can be the last $14^{th}$ LSB of the output of the accumulator Acc in this case. And the sign circuit SIGN, which may be the inverter, can alternate the sign of the outputted modulated sine signal corresponding to the symmetric sample address ADDRESS' every four period 4T. That is, the sign circuit SIGN outputs the sign bit "1" (positive) in two periods and the sign bit "0" (negative) in the next two periods as the sign bit of the outputted sine signal Sin_out.

Figure 4:
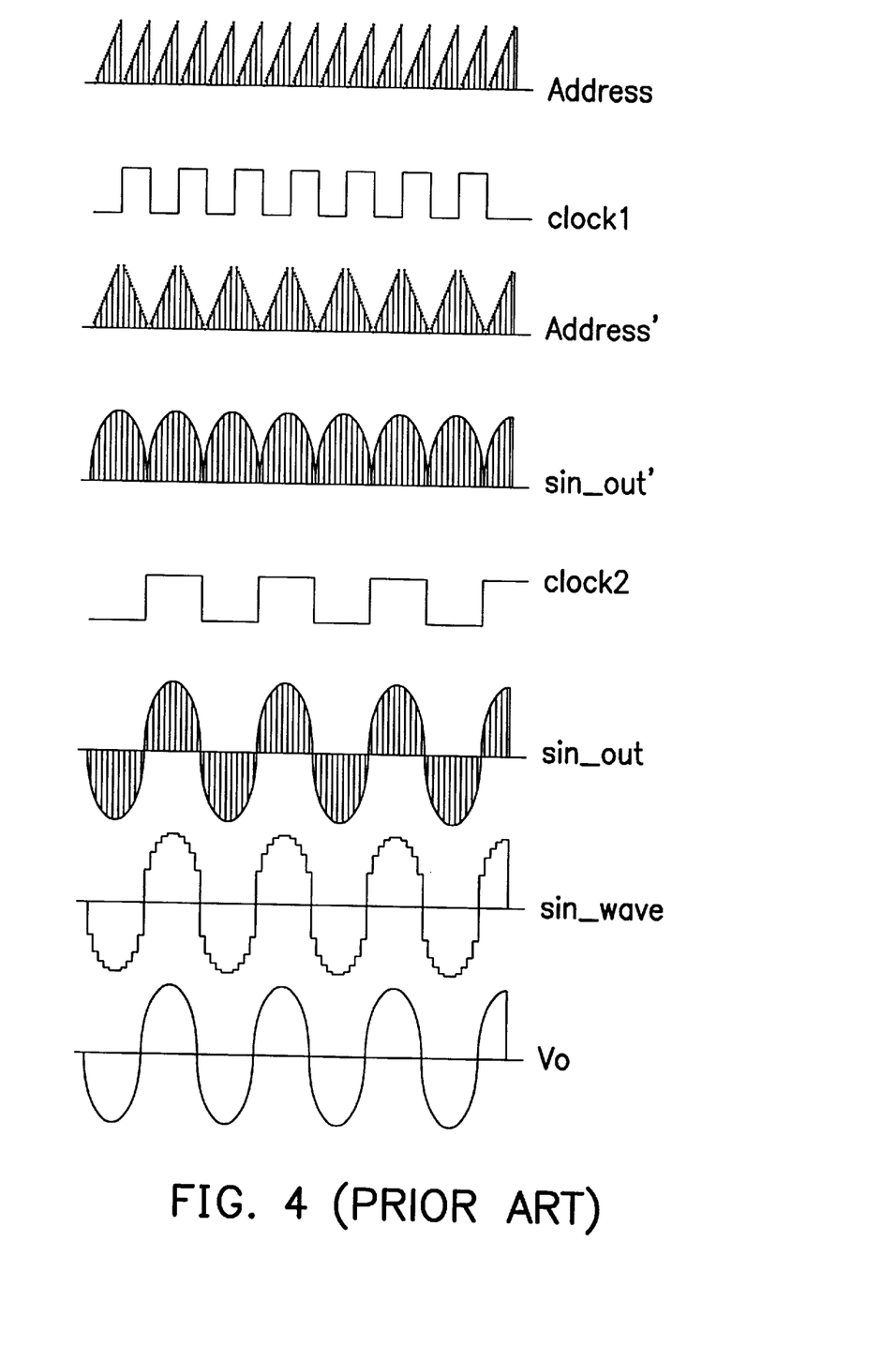
FIG. 4 (Prior Art) is a diagram showing the waveform of each node of the direct digital frequency synthesizer as shown in FIG. 3.

FIG. 4 (Prior Art) is a diagram showing the waveform of each node of the direct digital frequency synthesizer as shown in FIG. 3. Wherein, T is the period of the sample address ADDRESS outputted by the accumulator Acc; CLOCK1 is a clock of which the period is twice the period of the first MSB of the sample address ADDRESS; CLOCK2 is a clock of which the period is four times that of the period of the first MSB of the sample address ADDRESS; ADDRESS' is the symmetric sample address outputted from the symmetry circuit SYMMETRY; Sin_out' is the output of the sine ROM according to the symmetric sample address ADDRESS' of the symmetric circuit SYMMETRY; and Sin_out is the output sine signal from the sign circuit SIGN.

Further, for $\sin(x) = \sin(180°-x), \ 90° < x < 180°$ $\sin(x) = -\sin(x-180°), \ 180° < x < 360°$ the output sine signal Sin_out obtained after inserting the symmetry circuit SYMMETRY and the sign circuit SIGN can match both the phase and sign of a real sine function. Therefore, it is necessary to store only ¼ of the sine signal samples in the sine ROM, effectively reducing the size of the sine ROM.

SUMMARY OF THE INVENTION

However, even $2^{12}$ sine signal samples, which are ¼ of the original sine signal samples can still require a large size for the sine ROM. Therefore, an object of the present invention is to provide a direct digital frequency synthesizer DDFS, which utilizes a decomposition method to replace conventional sine table look-up method, so the sine ROM table can be eliminated and the operating frequency can be increased.

Another object of the present invention is to provide a direct digital frequency synthesizer DDFS, which divides the sine function into several areas of equal partitions and approximates the sine function in each area with one or more straight lines. In addition, the direct digital frequency synthesizer DDFS can also be structured in a pipeline fashion so that the operating frequency can be further increased.

Further, the direct digital frequency synthesizer DDFS of the present invention divides the ¼-period sine function into several areas with equal partitions (each is the exponential of 2) to obtain $$\sin(x) = f(X) + g(x),$$

where $f(x)$ is the coarse part of the sine function; and $g(x)$ is the fine part of the sine function. Therefore, $f(x)$ and $g(x)$ can be independently obtained and outputted without first passing through an adder to obtain the output sine signal Sin_wave.

The present invention provides a direct digital frequency synthesizer for outputting a sine signal. The synthesizer includes: an accumulator for sequentially outputting a sample address according to a frequency control signal; a symmetry circuit for taking the complement of the sample address according to a first clock, the period of the first clock being twice the period of the first MSB of the sample address, to obtain a symmetric sample address represented by N bits; a coarse circuit connected to the symmetry circuit for outputting the first M MSBs of the symmetric sample address as the first M MSBs of the sine signal; a fine circuit for predicting the last N-M LSBs of the sine signal from the last N-M LSBs of the symmetric sample address according to the first M MSBs of the symmetric sample address of the coarse circuit; and a sign circuit for outputting a sign bit of the sine signal according to a second clock, the period of the second clock being four times that of the period of the first MSB of the symmetric sample address.

Furthermore, in the direct digital frequency synthesizer of the present invention, the accumulator is a 16-bit accumulator, the sample address is the last 12 LSBs of the output of the accumulator, and the first clock is the last $13^{th}$ LSB of output of the accumulator. The coarse circuit receives the first 3 MSBs of the symmetric sample address as the first MSBs of the sine signal. The sign circuit is used to provide the sign bit of the sine signal according to the last $14^{th}$ LSB of the symmetric sample address. And the sign circuit consists of a multiplexer controlled by the last $14^{th}$ LSB of the symmetric sample address. The fine circuit is used to predict the last 9 LSBs of the sine signal from the last 9 LSBs of the symmetric sample address according to the first 3 MSBs of the symmetric sample address of the coarse circuit Additionally, in the direct digital frequency synthesizer of the present invention, the fine circuit predicts the last 9 LSBs of the sine signal according to:

$$g(x) = Ai^*x + Di$$

where, $g(x)$ is the last 9 LSBs of the sine signal;
x being the last 9 LSBs of the symmetric sample address; and
Ai, Di being parameters used in the fine circuit corresponding to the first 3 MSBs of the symmetric sample address.

Further, Ai is $1.1001_2$, $1.100101_2$, $1.100101_2$, $1.100101_2$, $1.01001_2$, $1.001_2$ when the first 3 MSBs of the symmetric sample address are $000_2$, $001_2$, $010_2$, $011_2$, $100_2$, $101_2$; Ai is $0.1011_2$, $0.1_2$ respectively according to the value of the first 3 MSBs of the symmetric sample address when the first 3 MSBs of the symmetric sample address are $110_2$; Ai is $0.1011_2$, $0.1_2$, $0.01000101_2$, $0.000101_2$ respectively according to the value of the first 3 MSBs of the symmetric sample address when the symmetric sample address are $111_2$; further, Di is 0, −497, −939, −1409, −1745, −1974 when the first 3 MSBs of the symmetric sample address are $000_2$, $001_2$, $010_2$, $011_2$, $100_2$, $101_2$; Di is −2067, −1747 respectively according to the value of the first 3 MSBs of the symmetric sample address when the first 3 MSBs of the symmetric sample address are $110_2$; Di is −1908, −1332, −536, 194 respectively according to the value of the first 3 MSBs of the symmetric sample address when the symmetric sample address are $111_2$.

In addition, in the direct digital frequency synthesizer of the present invention, the fine circuit is formed of several shifters and adders. And the direct digital frequency synthesizer can further include several registers for storing the sample address of the accumulator, the sign bit of the sign circuit, the first clock, the second clock and the symmetric sample address, and outputting with a reference clock.

Additionally, the direct digital frequency synthesizer of the present invention can be also structured in a pipeline fashion so that the operating frequency is increased.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

When conventional direct digital frequency synthesizers are fabricated on a micro chip, the sine ROM can take up a large area of the chip and result in time delay and relatively low operating frequency performance. Therefore, the present invention utilizes a decomposition method, which divides the sine function into several areas of equal partitions and can be represented by sin $(x)=f(x)+g(x)$ to eliminated the need for a sine ROM and increase the operating frequency.

Figure 5A:
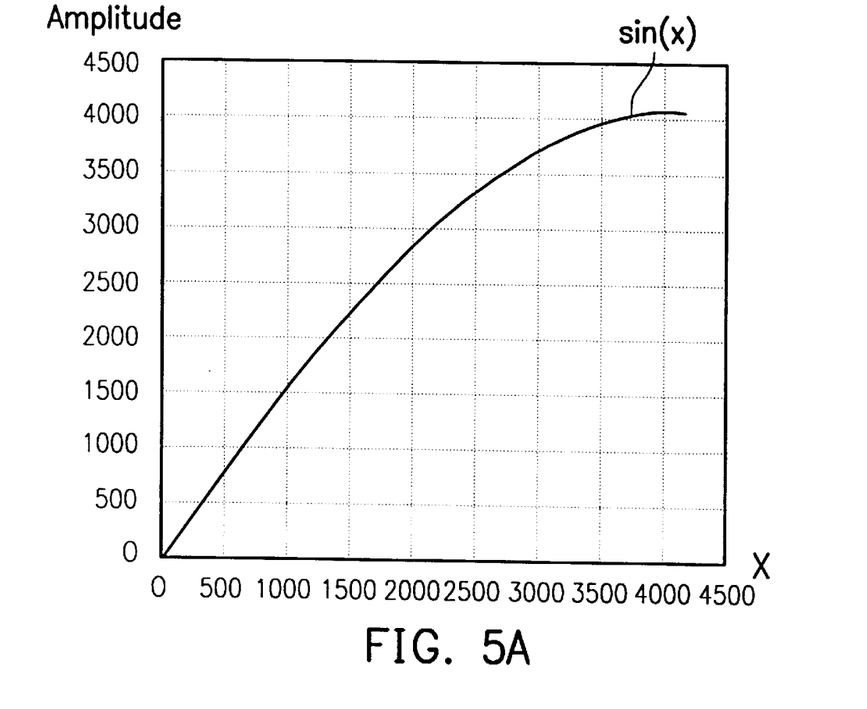
FIGS. 5A and 5B are diagrams showing decomposition of the sine function in ¼ period according to the present invention.
Figure 5B:
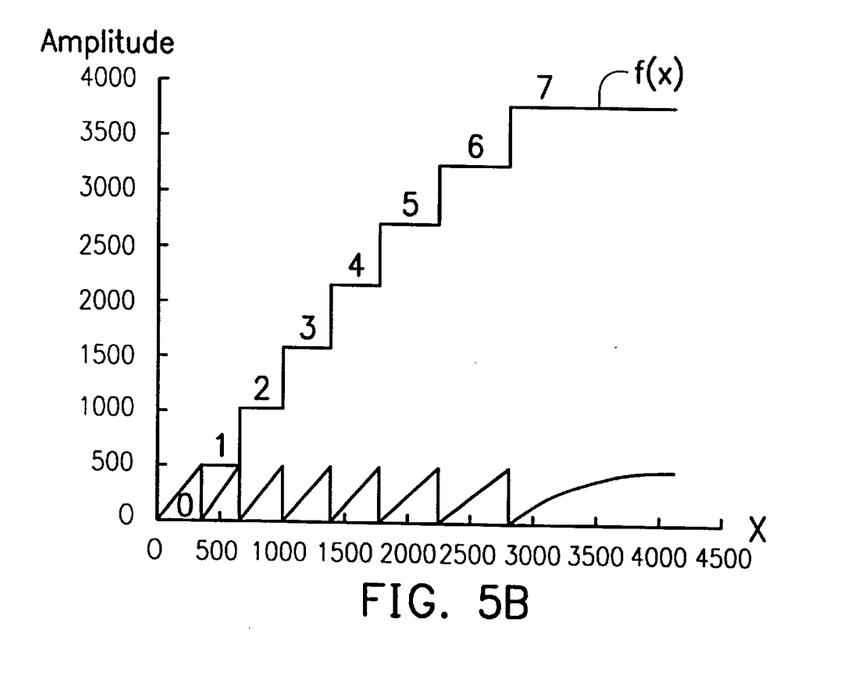

FIGS. 5A and 5B are diagrams showing decomposition of the sine function in ¼ period according to the present invention. In this embodiment, a ¼-period sine function sin (x) is divided into 8 areas with equal partitions, each of which is an exponential of 2. Where f(x) is the coarse part of the sine function sin (x), and g(x) is the fine part of the sine function sin (x). Further, it is known that when the sine function sin (x) is divided into 4096 partitions (that is, the sine function is represented by 12 bits) and 8 areas (each area includes 512 partitions), f(x) is exactly the first 3 MSBs of the sine function and g(x) is the remaining part. This makes possible for f(x) and g(x) to be output independently without further passing through an adder.

Additionally, in this decomposition method, f(x) can be easily accomplished by a simple logic circuit, and, g(x) can be accomplished by a simple linear approximation method. Further, the error of g(x) because of the approximation can be effectively controlled by increasing the number of the partitions of the sine function or increasing the number of the approximation straight lines.

In FIGS. 5A and 5B, if the error of the ¼-period sine function sin (x) is controlled under 7, g(x) in area 0 through area 5 are at least approximated by one straight line, g(x) in area 6 is at least approximated by 2 straight lines and g(x) in area 7 is at least approximated by 4 straight lines. The preferred approximation straight line(s) used in this embodiment are listed in Table 1.

TABLE 1

| | | |
|---|---|---|
| area 0: | $g(x) = 1.5625_{10}x = 1.1001_2x$, | $x \in [0, 326]$ |
| area 1: | $g(x) = 1.53125_{10}x - 497 = 1.100101_2x - 497$, | $x \in [327, 658]$ |
| area 2: | $g(x) = 1.4375_{10}x - 939 = 1.100101_2x - 939$, | $x \in [659, 1002]$ |
| area 3: | $g(x) = 1.40625_{10}x - 1409 = 1.100101_2x - 1409$, | $x \in [1003, 1365]$ |
| area 4: | $g(x) = 1.28125_{10}x - 1745 = 1.01001_2x - 1745$, | $x \in [1366, 1760]$ |
| area 5: | $g(x) = 1.125_{10}x - 1974 = 1.001_2x - 1974$, | $x \in [1761, 2211]$ |
| area 6: | $g(x) = 0.9375_{10}x - 2067 = 0.1111_2x - 2067$, | $x \in [2212, 2495]$ |
| | $g(x) = 0.8125_{10}x - 1747 = 0.1101_2x - 1747$, | $x \in [2496, 2778]$ |
| area 7: | $g(x) = 0.6875_{10}x - 1908 = 0.1011_2x - 1908$, | $x \in [2779, 3071]$ |
| | $g(x) = 0.5_{10}x - 1332 = 0.1_2x - 1332$, | $x \in [3072, 3455]$ |
| | $g(x) = 0.26953125_{10}x - 536 = 0.01000101_2x - 536$, | $x \in [3456, 3839]$ |
| | $g(x) = 0.078125_{10}x - 194 = 0.000101_2x + 194$, | $x \in [3840, 4095]$ |

Figure 6:
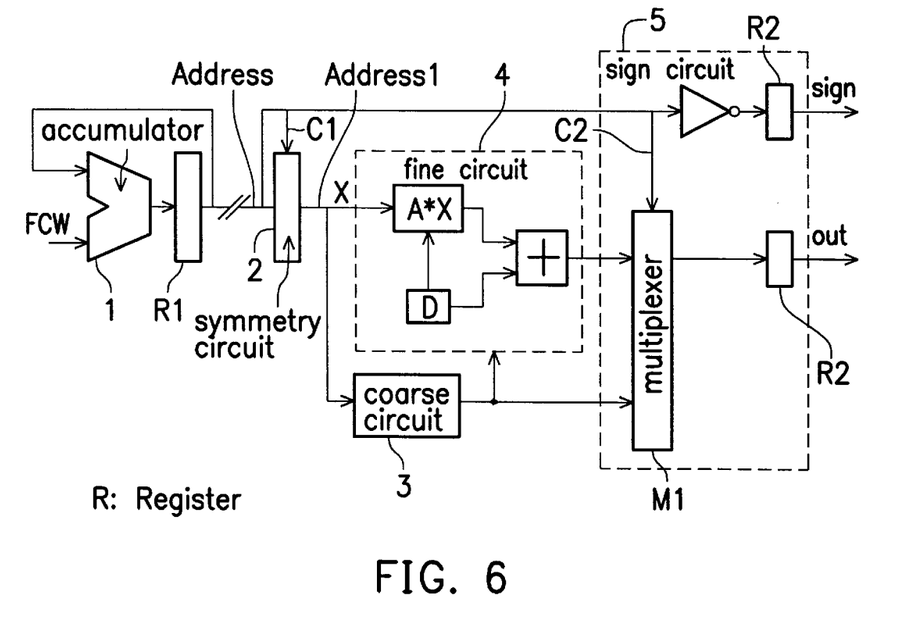
FIG. 6 is a circuit diagram of the direct digital frequency synthesizer according to the present invention.

FIG. 6 is a circuit diagram of the direct digital frequency synthesizer according to the present invention, which comprises an accumulator 1, a symmetry circuit 2, a coarse circuit 3, a fine circuit 4 and a sign circuit 5.

The accumulator 1 is provided for sequentially outputting a sample address ADDRESS according to a frequency control word FCW. In this embodiment, the frequency control word FCW can be the digital signal Data_in of the GFSK modulation/demodulation systems after passing through the Gaussian low-pass filter GLPF, for controlling the period T of the sample address ADDRESS.

Figure 7:
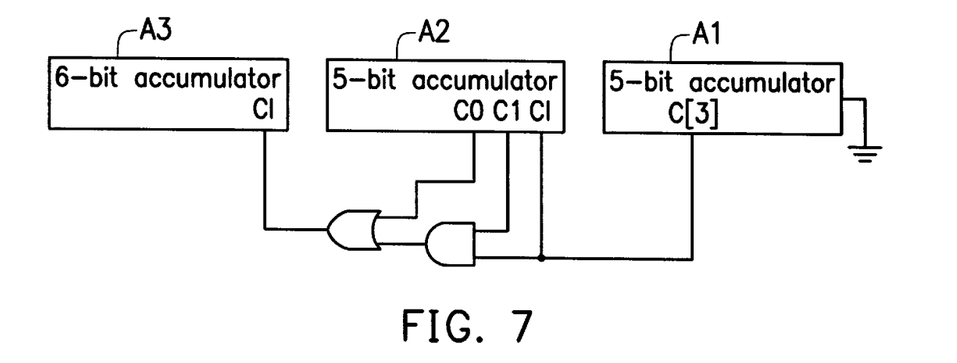
FIG. 7 is a block diagram showing the accumulator of the present invention.

In addition, the accumulator 1 can be a carry select adder (CSA). As shown in FIG. 7, the accumulator can be formed by two 5-bit accumulators A1, A2 and one 6-bit accumulator A3 so that the operating frequency can be further improved.

The symmetry circuit 2 is provided for taking the 1's (or 2's) complement of the sample address ADDRESS according to a clock C1, of which the period is twice the period of the first MSB of the sample address ADDRESS, to obtain a symmetric sample address ADDRESS1.

In this embodiment, when the accumulator 1 includes 16 bits as previously described, the sample address ADDRESS can be represented by the last 12 LSBs of the output of the accumulator 1. And, the symmetry circuit 2 is controlled by a clock Cl of which the period is twice the period of the first MSB of the sample address ADDRESS and which can be the $13^{th}$ LSBs of the output of the accumulator 1. Further, the symmetry circuit 2 can also be an XOR gate as in conventional direct digital frequency synthesizers so that the phase of the output sine signal is modified. Therefore, when the symmetry circuit 2 in one period outputs a normal sample address, in the next period the symmetry circuit would output the complement of the sample address ADDRESS as the symmetric sample address ADDRESS1.

Thus the present invention replaces the ROM in conventional direct digital frequency synthesizers by decomposing the sine function.

The coarse circuit 3 is provided for outputting the first M MSBs of the symmetric sample address as the first M MSBs of the sine signal. In this embodiment, f(x) is represented by 3 bits, that is, the ¼-period sine function sin (x) is divided into 8 areas (area 0 to area 7). And, f(x) is exactly the first 3 MSBs of the sine function sin (x).

Figure 8:
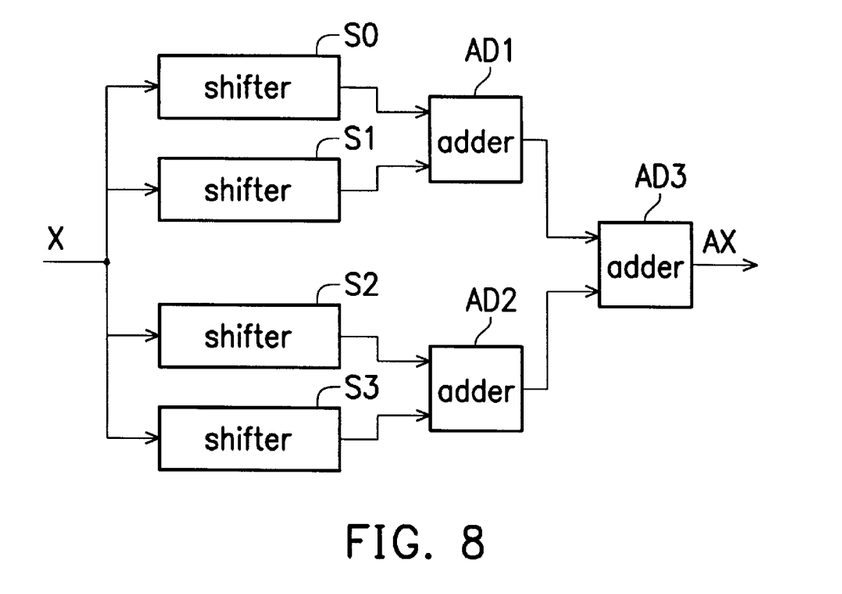
FIG. 8 is a block diagram showing an example of the fine circuit according to the present invention.

The fine circuit 4 is provided for predicting the last N-M LSBs of the sine signal from the last N-M LSBs of the symmetric sample address according to the first M MSBs of the symmetric sample address of the coarse circuit. In this embodiment, the fine circuit can be formed by several shifters S0, S1, S2, S3 and adders AD1, AD2, AD3 as shown in FIG. 8. And the fine circuit 4 approximates the sine function sin (x) according to the formula listed in Table 1.

Further, the sign circuit 5 is provided for outputting a sign bit of the sine signal according to a clock C2 of which the period is four times that of the period of the first MSB of the symmetric sample address and which can be the $14^{th}$ LSB of the output of the accumulator 1. Besides, the sign circuit 5 can also be formed by a multiplexer M1, therefore, the sign circuit 5 can output a sign bit "1" (represent positive) and the sine signal obtained from the coarse circuit 3 and the fine circuit 4 in two periods, while outputting a sign bit "0" (represent negative) and the complement of the sine signal obtained from the coarse circuit 3 and the fine circuit 4 in the next two periods as the output sine signal.

In this embodiment, the symmetry circuit 2 and the sign circuit 5 are used to adjust the phase and the sign of the output sine signal as in conventional ones.

Further, a register R1 is provided between the accumulator 1 and the symmetry circuit 2, for storing the sample address ADDRESS and outputting it synchronized with a reference clock. The sample address ADDRESS is obtained by truncating the output of the accumulator 1.

Meanwhile, a register R2 can also be provided before the sine signal of the sign circuit 5 is output to the digital-to-analog converter DAC, for synchronization purposes.

Figure 9:
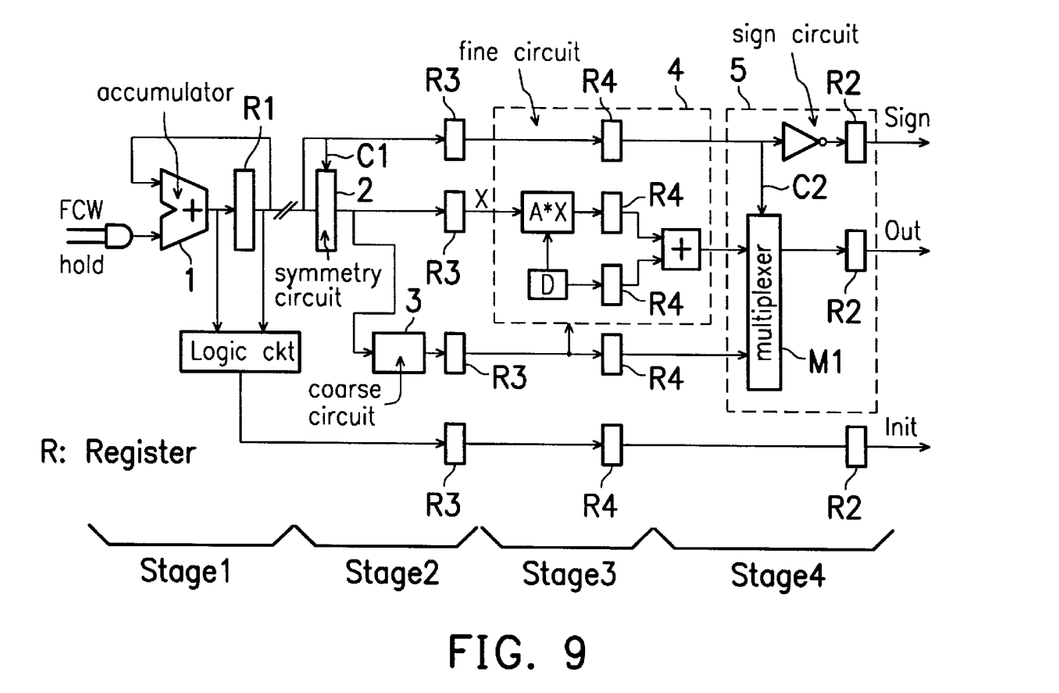
FIG. 9 is a block diagram showing a direct digital frequency synthesizer structured in a pipeline fashion according to the present invention.

In addition to improving the maximum operating frequency of the converter, the direct digital frequency synthesizer of the present invention, which is fabricated on the micro chip, can be structured in a pipeline fashion as shown in FIG. 9. Differing from the previously discussed embodiment, the whole synthesizer is designed as four stages and additional registers R3, R4 are provided for synchronization purposes. Therefore, the operating frequency of the synthesizer can be further increased while still eliminating the need for a sine ROM.

Summing up the above, the direct digital frequency synthesizer of the present invention is designed to decompose the ¼-period sine function as sin $(x)=f(x)+g(x)$, where $f(x)$ is the coarse part of the sine function sin $(x)$ and $g(x)$ is the fine part of the sine function sin $(x)$. Therefore, $f(x)$ and $g(x)$ can be outputted independently without further passing through an adder to obtain the output sine signal Sin_out.

In addition, the accumulator 1 can be a CSA, so that delays of this synthesizer can be controlled within (5 bits+ 1+1) gate delays, that is, approximately 5.3 ns.

When the sign circuit 5 in this embodiment outputs a sign bit "0" (representing negative), the output sine signal should be a 2's complement of the output of the coarse circuit 3 and the fine circuit 4. However, a device taking the 2's complement of the output of the coarse circuit 3 and the fine circuit 4 is much more complex than a device taking a 1's compliment of the output of the coarse circuit 3 and the fine circuit 4, which can be achieved by simple logic. Therefore, in this embodiment, the sign circuit 5 preferably takes a 1's complement since SNR in this case is only reduced from 62.734 dB to 60.7707 dB, which is acceptable.

In this embodiment, when the 12-bit output sine signal is outputted to the digital-to-analog converter DAC (AD9721BN), the output sine signal is of only 10-bit resolution at operating frequency of 80 MHz, the frequency of the output sine signal $80 M/2^{14}=4.88$ KKHz, and the second harmonic is 9.77 KHz at −61.47 dB.

Further, when using the PM5786B pulse generator (1 Hz to 125 MHz) or a 4-leg oscillator, the highest operating frequency is at 85 MHz with total current 16.14 mA, power consumption is 80.7 mW, the gate count, 2450; the core is $951*1101$ mm² and the layout(including pads) is $2328*2425$ mm².

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. A direct digital frequency synthesizer to output a sine signal, comprising:

an accumulator sequentially outputting a sample address with a periodic MSB according to a frequency control signal, the sample address represented by N bits, wherein N is an integer;

a symmetry circuit controlled by a first clock with a period twice that of the MSB of the sample address to produce a symmetry sample address by producing a complement of the sample address;

a coarse circuit connected to the symmetry circuit to output a first M bits of the symmetry sample address as a first M bits of the sine signal, wherein M is an integer that is less than N;

a fine circuit connected to the symmetry circuit to predict a last N-M bits of the sine signal from a last N-M bits of the symmetry sample address according to the first M bits of the symmetry sample address; and a sign circuit connected to the accumulator for receiving said sample address, the coarse circuit and the fine circuit, controlled by a second clock with a period four times that of the MSB of the symmetry sample address to output said sine signal and a sign bit of the sine signal.

2. The direct digital frequency synthesizer as claimed in claim 1, wherein the accumulator is a 16-bit accumulator having an output, the sample address is a last 12 bits of the accumulator output, and the first clock is a bit preceding the first bit of the sample address.

3. The direct digital frequency synthesizer as claimed in claim 2, wherein the coarse circuit receives a first 3 bits of the symmetric sample address as a first 3 bits of the sine signal.

4. The direct digital frequency synthesizer as claimed in claim 2, wherein the sign circuit is controlled by a bit preceding the first bit of the symmetry sample address by two bits to provide the sign bit of the sine signal.

5. The direct digital frequency synthesizer as claimed in claim 4, wherein the sign circuit comprises a multiplexer controlled by the second clock to provide the sign bit of the sine signal.

6. The direct digital frequency synthesizer as claimed in claim 2, wherein the fine circuit predicts a last 9 bits of the sine signal from a last 9 bits of the symmetric sample address according to a first 3 bits of the symmetric sample address.

7. The direct digital frequency synthesizer as claimed in claim 6, wherein the fine circuit predicts the last 9 bits of the sine signal from the last 9 bits of the symmetric sample address by:

$$g(x)=Ai*x+Di$$

where x is the last 9 bits of the symmetric sample address, Ai and Di are constants determined by the first 3 bits of the symmetric sample address, and $g(x)$ is the predicted last 9 bits of the sine signal.

8. The direct digital frequency synthesizer as claimed in claim 7, wherein the fine circuit comprises a plurality of shifters and a plurality of adders.

9. The direct digital frequency synthesizer as claimed in claim 1, further comprising a first register to store the sample address from the accumulator and output the sample address to the symmetry circuit in synchronization with a reference clock.

10. The direct digital frequency synthesizer as claimed in claim 9, further comprising a second register to store the sign bit from the sign circuit and output the sign bit in synchronization with the reference clock.

11. The direct digital frequency synthesizer as claimed in claim 1, wherein the the fine circuit is structured in a pipeline fashion.

12. A method of producing a sine signal by direct digital frequency synthesis comprising the steps of:

sequentially generating a sample address with a periodic MSB according to a frequency control signal, the sample address being represented by N bits, wherein N is an integer;

generating a symmetry sample address by producing a complement of the sample address;

outputting a first M bits of the symmetry sample address as a first M bits of the sine signal, wherein M is an integer that is less than N;

predicting a last N-M bits of the sine signal from a last N-M bits of the symmetry sample address according to the first M bits of the symmetry sample address in accordance with a linear approximation; and generating the sine signal based on the outputted M bits and the predicted N-M bits.

* * * * *